Patented Nov. 7, 1922.

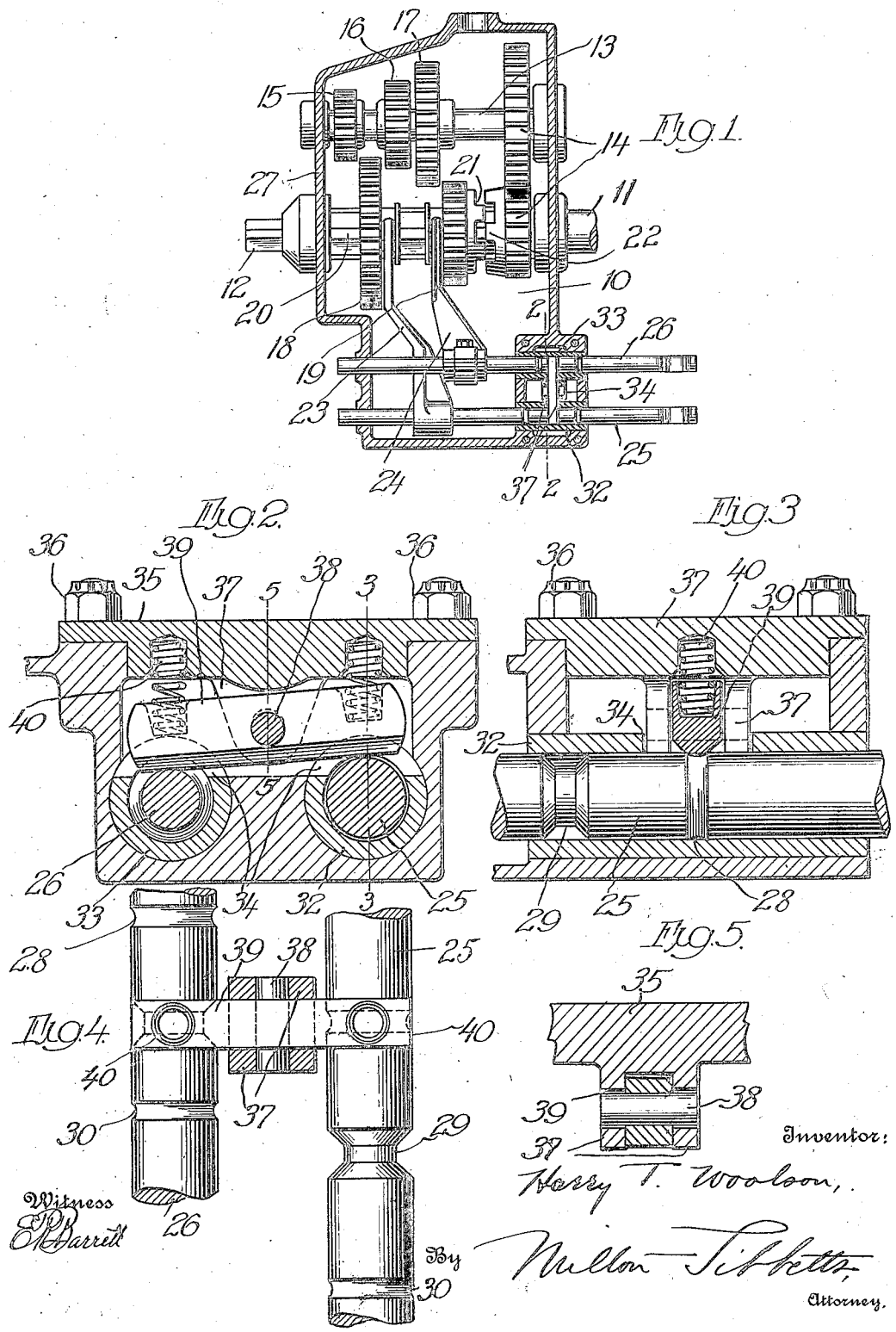

1,434,643

UNITED STATES PATENT OFFICE.

HARRY T. WOOLSON, OF DETROIT, MICHIGAN, ASSIGNOR TO PACKARD MOTOR CAR COMPANY, OF DETROIT, MICHIGAN, A CORPORATION OF MICHIGAN.

GEAR-SHIFTING MECHANISM.

Application filed June 19, 1916. Serial No. 104,438.

*To all whom it may concern:*

Be it known that I, HARRY T. WOOLSON, a citizen of the United States, and resident of Detroit, Wayne County, State of Michigan, have invented certain new and useful Improvements in Gear-Shifting Mechanism, of which the following is a specification.

This invention relates to motor vehicles, and particularly to the speed changing gear mechanism and means for controlling the operation thereof.

One of the objects of the invention is to provide an interlocking device for automatically locking one shifter rod positively in neutral position and the other shifter rod yieldingly in gear meshing position.

Another object of the invention is to provide a device to automatically lock both shifter rods yieldingly in neutral position.

Another object of the invention is to provide, in a speed change gear mechanism having two shifter rods, a single unitary means for positively locking either shifter rod in the neutral position while yieldingly locking the other shifting rod in the gear meshing position.

Other objects of the invention will appear from the following description taken in connection with the drawings which form a part of this specification, and in which:

Fig. 1 is a plan view and part section of a gear mechanism embodying one form of the invention;

Fig. 2 is an enlarged transverse section on line 2—2 of Fig. 1 showing one shifter rod in neutral position and the other in gear meshing position;

Fig. 3 is a longitudinal section approximately on line 3—3 of Fig. 2;

Fig. 4 is a plan view of the rods and locking element in the position shown in Fig. 2; and Fig. 5 is a section taken on the line 5—5 of Fig. 2.

In the drawings 10 designates a speed changing gear mechanism having a clutch or driving shaft 11 and an aligned transmission shaft 12. A lay or countershaft 13 parallel to the shaft 12 is constantly driven by the shaft 11 through the gears 14. Gears 15, 16 and 17 are fixedly mounted on the lay shaft while gears 18 and 19 are slidably mounted on the transmission shaft being held against rotation on that shaft by keys and ways 20. The gear 18 may slide into mesh directly with the gear 16 and indirectly with the gear 15 through an idle pinion, not shown. The gear 19 may slide into mesh with the gear 17 and is provided on its hub with teeth 21 which will mesh with teeth 22 on the hub of the gear 14 on the shaft 11 when the gear 19 is moved in that direction. The sliding gears 18 and 19 are actuated by arms 23 and 24 fixed on shifter rods 25 and 26 respectively, and the entire mechanism is enclosed within a casing 27. The operation of the speed changing gears is well known and will not be described in greater detail.

The shifter rods 25 and 26 are supported in parallel in the casing 27 and are provided with means for retaining them in neutral and in gear meshing positions. It is desirable that when one rod is in gear or gear meshing position, the other rod should be locked positively in neutral position so that it may not be accidentally or otherwise shifted therefrom. The present invention contemplates the use of a single device for so interlocking the rods and for simultaneously yieldingly locking the shifted rod in its gear meshing position. In the construction shown the rods are each provided with spaced grooves 28, 29 and 30, the intermediate groove 29 being deeper than the other grooves and it may be called the neutral groove while the others may be called gear position grooves.

At one corner of the casing 27 through which the shifter rods pass is shown a chamber 31, in which are mounted tubes 32 and 33 through which the shifter rods 25 and 26 pass and in which they reciprocate. The upper portion of each tube intermediate the walls of the chamber is cut away as indicated at 34. The chamber 31 is closed by a cover plate 35 held in place by nuts and bolts 36 or other suitable means, and on the under side of the cover plate are ears 37 which support a pin 38 of a bar 39 which is set transversely of the rods 25, 26. As shown, the pin is fixed in the bar and turns freely in the ears 37 the openings of which are slightly elongated vertically to allow lost motion for a purpose hereinafter set forth.

The lower edge of the bar 39 is beveled to more readily enter and leave the grooves in the shifter rods through the openings 34 in the tubes. Springs 40 mounted in pockets in the bar and cover plate bear constantly against the bar and tend to press it downwardly into the grooves of the rods.

The pivot pin is so arranged relatively to the shifter rods that the lower edge of the bar must at all times engage the deep groove in one of the rods. When the edge of the bar engages both deep grooves the rods are yieldingly locked in neutral position, at other times however, that rod, the deep groove of which is engaged by the bar, is positively locked in neutral position while the other rod is yieldingly locked when the bar engages one of the shallow grooves, at which time the rod is in the gear meshing position.

The operation of the locking bar will be most easily understood by a consideration of Figs. 2, 3 and 4, in which the bar 39 is shown as engaging the shallow groove 28 in the rod 25 and the deep groove 29 in the rod 26. The rod 26 is thus positively locked while the rod 25 is yieldingly locked. Upon reciprocation of the rod 25 the bar is forced out of the groove 28 and rests on the ungrooved portion of the rod. In this movement of the bar the left end is pivoted on the rod 26 and the pin 38 is raised by reason of the enlarged openings in the ears 37. The rod 26 is positively locked until the rod 25 is returned to the neutral position when the bar will engage the grooves 29 in both rods. Either, but not both, of the rods can then be reciprocated as desired and the other positively locked in the neutral position.

While only one embodiment of this invention has been shown and described, it is obvious that other forms might be created without going beyond the spirit and scope of this invention as set forth in the following claims.

Having thus described my invention, what I claim and desire to secure by Letters Patent is:—

1. In a gear shifting mechanism, in combination, parallel shifter rods, and a single means for positively locking one of said rods in one position and yieldingly locking the other in another position.

2. In a gear shifting mechanism, in combination, parallel shifter rods, and a single means for positively locking one of said rods in neutral position while yieldingly locking the other in gear position.

3. In a gear shifting mechanism, in combination, parallel shifter rods, and a pivoted device operated by the rods for positively locking one of said rods while yieldingly locking the other of said rods.

4. In a gear shifting mechanism, in combination, parallel shifter rods, and a single device for positively locking either of said rods while yieldingly locking the other.

5. In a gear shifting mechanism, in combination, parallel shifter rods having grooves and means operated by the rods and engaging certain of said grooves for positively locking one of said rods while yieldingly locking the other rod.

6. In a gear shifting mechanism, in combination, parallel shifter rods, each of said rods having grooves of two different depths, and means engaging the deeper groove of one rod and the shallower groove of the other rod for positively locking the first rod while yieldingly locking the second rod.

7. In a gear shifting mechanism, in combination, parallel shifter rods each of said rods having grooves of two different depths, and a single device movable by the rods and engaging the deeper groove of one rod and the shallower groove of the other rod for positively locking the first rod while yieldingly locking the second rod.

8. In a gear shifting mechanism, in combination, parallel shifter rods each of said rods being provided with grooves of two different depths, and a pivoted bar shiftable by the rods and engaging the deeper groove of one rod and the shallower groove of the other rod for positively locking the first rod while yieldingly locking the second rod.

9. In a gear shifting mechanism, in combination, parallel shifter rods each of said rods being provided with grooves, and means shiftable by the rods and engaging certain of said grooves for positively locking one of said rods in one position while yieldingly locking the other rod in a different relative position.

10. In a gear shifting mechanism, in combination, parallel shifter rods each of said rods being provided with grooves of two different depths, and means shiftable by the rods and engaging the deeper groove of one rod and the shallower groove of the other rod for positively locking the first rod in one position while yieldingly locking the other rod in a different relative position.

11. In a gear shifter mechanism, in combination, parallel shifter rods, and a bar pivoted transversely of said rods and movable by the rods for positively locking either of said rods while yieldingly locking the other.

12. In a gear shifter mechanism, in combination, parallel shifter rods, and a single means for simultaneously and yieldingly locking said rods in neutral position.

13. In a gear shifter mechanism, in combination, parallel shifter rods, each rod provided with grooves of two different depths, and means engaging the deeper groove in each rod for simultaneously and yieldingly locking said rods in neutral position.

14. In a gear shifter mechanism, in combination, parallel shifter rods, each rod provided with grooves of two different depths, and a single device engaging the deeper groove in each rod for simultaneously and yieldingly locking said rods in neutral position.

15. In a gear shifter mechanism, in combination, parallel shifter rods, each rod provided with grooves of two different depths, and means including a pivoted bar engaging the deeper groove in each rod for simultaneously and yieldingly locking said rods in neutral position.

16. In a shifting mechanism, in combination, shifter rods, and means comprising a pivoted bar moved by the rods for positively locking either of said rods while yieldingly locking the other.

17. In a shifting mechanism, in combination, shifter rods, and means comprising a locking bar moved by the rods and adapted to engage both rods, said bar positively locking one of said rods while yieldingly locking the other.

18. In a shifting mechanism, in combination, shifter rods, and means comprising a locking bar adapted to engage both rods, said bar pivotally supported between its ends and adapted to pivot adjacent one end on one of the rods to yieldingly lock the other rod.

19. In a shifting mechanism, in combination, shifter rods, a transversely extending locking bar, spring means pressing the locking bar in engagement with both said rods, and means preventing movement of the bar with the rods.

20. In a shifting mechanism, in combination, shifter rods, a transversely extending locking bar pivotally supported between its ends and adapted to engage both said rods, the pivotal support of said bar permitting bodily movement also of the bar, and springs at either end of the bar to press the bar towards the rods.

21. In a gear shifting mechanism, in combination, parallel shifter rods, and a pivoted device operated entirely independently of any means for shifting the rods, for positively locking one of said rods while yieldingly locking the other.

22. In a gear shifting mechanism, in combination, parallel shifter rods having grooves, and means operated entirely independently of any means for shifting the rods, and engaging certain of said grooves for positively locking one of said rods while yieldingly locking the other rod.

23. In a gear shifting mechanism, in combination, spaced shifter rods, supporting means for said rods, means providing a connecting space between said rods, and means supported in said space for positively locking one of said rods while yieldingly locking the other rod.

24. In a gear shifting mechanism, in combination, spaced parallel shifter rods having locking grooves, a casing in which said rods operate and providing a connecting space between said rods, and means in said connecting space cooperating with said grooves for positively locking one of said rods while yieldingly locking the other rod.

In testimony whereof I affix my signature.

HARRY T. WOOLSON.